United States Patent [19]
Field et al.

[11] 3,723,513
[45] Mar. 27, 1973

[54] ORGANIC DISULFIDE SULFINIC ACID COMPOUNDS

[75] Inventors: Lamar Field, Nashville; Robert B. Barbee, Kingsport, both of Tenn.

[73] Assignee: The United States of America as represented by the Secretary of the Army

[22] Filed: Nov. 6, 1969

[21] Appl. No.: 874,677

[52] U.S. Cl..............260/513.7, 424/303, 260/327 R
[51] Int. Cl..............................................C07c 145/00
[58] Field of Search...................................260/513.7

[56] References Cited

UNITED STATES PATENTS 3,203,996  8/1965  Moore.............................260/458 X

OTHER PUBLICATIONS

Field et al. "Org. Disulfides and Related Substances," J. Org. Chem. 1969 34(1), 36–41.
Goethals et al., "Synthesis of Thiosultones", Bull. Soc. Chem. Belges, 78 (1969) 191–196.

Primary Examiner—Leon Zitver
Assistant Examiner—Leo B. DeCrescente
Attorney—Charles K. Wright, Jr., William G. Gapcynski and Lawrence A. Neureither

[57] ABSTRACT

Organic disulfide compounds, useful as antiradiation agents, having the general formula

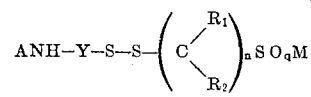

and their synthesis by subjecting 1,1-dioxides of heterocyclic disulfides to the action of a thiolate ion, whereby cleavage is effected between the sulfur and sulfonyl units. In the general formula: A may be a hydrogen, alkyl, or acyl grouping; Y may be a straight or substituted aliphatic chain having two or three carbon atoms interposed directly between the ANH grouping and the sulfur; $R_1$ and $R_2$ may be hydrogen, alkyl, aryl, or cycloalkyl; n may be the integers 3 through 5; $q$ is 2 or 3; and M may be hydrogen or a metallic element as selected from group 1A of the Periodic Table such as sodium or potassium.

5 Claims, No Drawings

ORGANIC DISULFIDE SULFINIC ACID COMPOUNDS

The invention herein described was made in the course of or under a contract or subcontract thereunder with the Department of the Army.

BACKGROUND OF THE INVENTION

The present invention relates to new organic disulfide compounds, which possess antiradiation properties, and to the method of their synthesis. Prior to the present invention it was accepted that antiradiation compounds required a free mercapto group (—SH) for activity, that compounds containing sulfinic groups would not exhibit antiradiation properties, and that antiradiation activity would drop with the presence of acylates. Nevertheless, with the disulfides of the present invention, antiradiation properties were exhibited in the presence of such groups. In fact the advantages of effectiveness with low order of toxicity are achieved through the functional groups herein disclosed.

SUMMARY OF THE INVENTION

The radiation protective compounds of the present invention may be represented by the following general structural formula

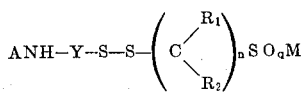

where A is a hydrogen, alkyl, or acyl group; Y a straight or substituted aliphatic chain having two or three carbon atoms interposed directly between the ANH grouping and the sulfur; $R_1$ and $R_2$ are hydrogen, alkyl, aryl, or cycloalkyl groups; $n$ may be any of the integers 3 through 5; $q$ may be either 2 or 3; and M is hydrogen or a metallic element of Group 1A of the Periodic Table such as sodium or potassium.

DESCRIPTION OF THE PREFERRED EMBODIMENTS

In accordance with the invention cyclic disulfides, such as 1,2-dithiolane, 1,2-dithiane, and 1,2-dithiepane were first prepared from alpha, omega alkyl dithiols. The carbon chain between the thiol groups may bear substituents. Cyclization of the preferred disulfides is accomplished as follows:

INTERMEDIATE I

1,2-Dithiolane 1,2-Dithiolane was best prepared from a point of yield by adding simultaneously, over a 6 hour period, two separate solutions, i.e., a solution of 1,3-propanedithiol (21.6 g, 200 mmoles) and acetic acid (400 ml), and a solution of $H_2O_2$ (20.0 ml of 10.10 M, 202 mmoles) in acetic acid (400 ml), to a vessel, protected from light with metal foil, containing acetic acid (360 ml) and potassium iodide (0.80 g, 48 mmoles) maintained at 75° C. After one more hour of stirring, the precipitate was separated. The yield (70 to 84 percent) was determined and the product identified as 1,2-dithiolane from the ultraviolet absorption at 330 m$\mu$ by taking $\epsilon$ to be 147.

INTERMEDIATE II

1,2-Dithiane 1,2-Dithiane was prepared by adding powdered p-toluenesulfonyl chloride (66 g, 346 mmoles) to a vigorously stirred mixture of 1,4-butanedithiol (40 g, 327 mmoles) in 5 percent aqueous sodium hydroxide (600 ml, 750 mmoles) at 5° C. The mixture was stirred overnight and extracted with methylene chloride. The extract was washed with water and dried to yield 93 percent of 1,2-dithiane which was identified from its infrared absorption (neat) at 2910($s$), 1440($s$), 1410($s$), 1230($s$), 920($s$) and 840 cm$^{-1}$. The reaction is represented as follows:

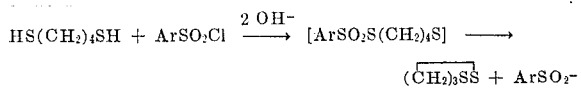

INTERMEDIATE III

1,2-Dithiepane 1,2-Dithiepane was prepared, much as reported by A. Schoberl and H. Grafje, Anno, 614,66 (1958), by adding 1,5-pentanedithiol (27.2 g, 200 mmoles) in ether (200 ml) dropwise to a solution of ether (500 ml) and acetic acid (200 ml) containing $FeCl_3 \cdot 6H_2O$ (162 g, 600 mmoles) at the reflux temperature. The mixture was left standing for one day, and then the 1,2-dithiepane was isolated. A 54 percent yield of the product was obtained.

After cyclization, each of the heterocyclic disulfides was oxidized to the 1,1-dioxide and 1,1,2,2-tetroxide. Oxidation of 1,2-dithiane to the 1,1-dioxide and to the 1,1,2,2-tetroxide was best achieved using a solution of hydrogen peroxide in acetic acid. It was found that the use of hydrogen peroxide in acetic acid would oxidize 1,2-dithiolane, and 1,2-dithiepane to their 1,1-dioxides; but that their tetroxides could not be obtained directly from the cyclic disulfides. The tetroxides of the 1,2-dithiolane and 1,2-dithiepane were prepared by oxidizing the dioxides. The low yield of the tetroxides and the disadvantage of having to obtain them through oxidation of the 1,1-dioxides made use of the 1,1-dioxides rather than the tetroxides the most convenient form for use in the practice of this invention. The oxidation reaction is represented by the general formula as follows:

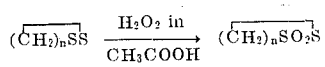

Oxidation of the preferred heterocyclic disulfides is as follows:

INTERMEDIATE IV

1,2-Dithiane 1,1-Dioxide 1,2-Dithiane (0.1 mole) in acetic acid (75 ml) was mixed at 22°–62° C. with hydrogen peroxide (26.5 ml of 9.5M $H_2O_2$) in glacial acetic acid (25 ml). The 1,2-dithiane was oxidized to 1,2-dithiane 1,1-dioxide. A 66 percent yield of the product was obtained and its melting point determined to be 54°–55° C.

INTERMEDIATE V

1,2-Dithiolane 1,1-Dioxide 1,2-Dithiolane (37 mmoles) was mixed in acetic acid (290 ml) containing tungstic acid (2.4 mmoles) at 65° C. Hydrogen peroxide (185 mmoles, 18.3 ml of 10.10 M) in acetic acid (20 ml) was added dropwise. The mixture, shielded from light, was stirred at 25° C. for two days. The solid was removed and discarded. The solvent was evaporated to leave a residual oil. The oil was dissolved in methylene chloride (50 ml) which was washed with water, dried, and evaporated to give 1,2-dithiolane 1,1-dioxide (1.67 g) in a yield of 33 percent. Recrystallization from benzene-hexane and from carbon tetrachloride gave the dioxide with melting point 22°–22.5° C., infrared absorption at 1300 and 1120 cm$^{-1}$.

INTERMEDIATE VI

1,2-Dithiepane 1,1-Dioxide 1,2-Dithiepane (14.6 g, 109 mmoles) was added to acetic acid (200 ml); hydrogen peroxide (272 mmoles, 35.8 ml of 7.6 M) in acetic acid (50 ml) was added dropwise at ambient temperature, below 25° C. The mixture was stirred for two days, the solid removed, and the solvent evaporated. The oily residue was dissolved in methylene chloride, washed to neutrality with water, dried and evaporated. 1,2-Dithiepane 1,1-dioxide was obtained as a viscous oil (3.1 g, 17 percent yield, infrared bands at 1310(s) and 1120(s) cm$^{-1}$).

Continuing with the description of the invention, it was found that the ease of preparation and good yield of the 1,2-dithiane 1,1-dioxide made its use preferable to either 1,2-dithiolane 1,1-dioxide or to the 1,2-dithiepane 1,1-dioxide. Thus, 1,2-dithiane 1,1-dioxide was introduced to a thiolate ion and underwent what might be called "oxodisulfide cleavage" to give disulfides containing a sulfinate moiety, which in turn was converted to an alkyl or aryl sulfone, or a sulfonate. The general sequence for these reactions is as follows:

melting point of 163°–164° C., infrared absorption at 1640, 1560, and 1000(s) cm$^{-1}$. When calculated for $C_6H_{15}NOS_3$ the theoretical was C, 31.42; H, 6.59; N, 6.11; S, 41.93; analysis of compound found C, 31.13; H, 6.56; N, 5.99; S, 42.13.

EXAMPLE 2

Sodium 4-[2-Acetamidoethyldithio]butanesulfinate

To a solution of 14.3 g (93.9 mmoles) of 1,2-dithiane 1,1-dioxide; 11.2 g (93.9 mmoles) of 2-acetamidoethanethiol, and 250 ml of 95 percent ethanol; methanolic sodium methoxide (1.3 N) was added dropwise, below 25° C., until the solution became basic to pH test paper (67 ml, 88 mmoles). Removal of solvent left 26.0 g (94 percent) of crude sodium 4-[2-acetamidoethyldithio]butanesulfinate with a melting point of 205°–210° C., with softening at 90° C. For recrystallization, the solute was dissolved in a minimum of methanol, to which acetone was added to precipitate 24.3 g (88 percent) of the compound with melting point 210°–220° C. Purification for analysis was effected by adding ether to a solution of the latter in a minimum of methanol at 25° C. until a little precipitate formed; the precipitate was removed and more ether then was added to the filtrate to precipitate a second fraction. Three such fractionations gave the compound with melting point 215°–220° C. dec; infrared absorption at 3300(s), 1650(s), 1550, and 1000(s) cm$^{-1}$. When calculated for $C_8H_{16}NNaO_3S_3$ theoretical was: C, 32.75; H, 5.50; N, 4.77; S, 32.78; analysis of the compound revealed C, 32.63; H, 5.53; N, 4.54; S, 32.57.

EXAMPLE 3

Sodium 4-[2-Acetamidoethyldithio]butanesulfonate 0.48 Gram (2.2 mmoles) of sodium metaperiodate in 10 ml of water was added to 0.45 gram (1.5 mmoles) of compound of Example 2 in 10 ml of water at about 25° C. After 15 hours, the water was evaporated, and the

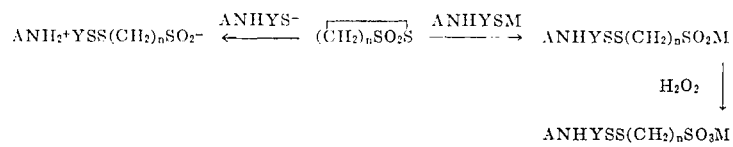

Wherein A, Y, M, and n are as previously described.

The final products of the invention are illustrated in the following examples:

EXAMPLE 1

4-[2-Aminoethyldithio]butanesulfinic Acid 0.5 Gram (3.3 mmoles) 1,2-dithiane 1,1-dioxide, prepared as described in II and IV, and 0.25 gram (3.3 mmoles) of 2-mercaptoethylamine were stirred together at temperature not above 25° C. in 15 ml of 95 percent ethanol for 30 minutes. The solid formed was removed by filtration to give 0.64 gram (86 percent yield) of 4-[2-aminoethyldithio]butanesulfinic acid. Melting point 157°–159° C. Recrystallization from methanol-ether gave the compound with a constant residue extracted with 15 ml of hot methanol. Acetone was added to the methanolic solution until a small amount of precipitate formed. The fraction showed infrared absorption at 3300, 1650(s), 1550, 1200(s), and 1060(s) cm$^{-1}$. Using a different procedure a disproportion reaction occurred giving in addition to the desired compound a compound in which the structure was $[NaO_3S(CH_2)_4S]_2$. To avoid the disproportion reaction sodium metaperiodate was used successfully. The infrared spectrum set forth above was identical with the desired compound separated from the disproportion compound. Addition of more acetone to above solution produced a final yield of 0.27 g (57 percent) of the product.

The compounds of this invention are useful pharmacological agents. They are anti-radiation agents; active upon oral or parenteral administration. Parenteral administration is preferred. Anti-radiation evaluation tests revealed that 4-[2-aminoethyldithio]butanesulfinic acid had a 67 percent survival rate at a dosage of 300 mg/kg; sodium 4-[2-acetamidoethyldithio]butanesulfinate had a 100 percent survival rate at a dosage of 47 mg/kg; and sodium 4-[2-acetamidoethyldithio]butanesulfonate had a 40 percent survival rate at a dosage of 800 mg/kg. Thus, the preferred compound is sodium 4-[2-acetamidoethyldithio]butanesulfinate. The complete results obtained from the tests are as follows:

ANTI-RADIATION EVALUATION

| Compound | Toxicity, $ALD_{50}$ mg./kg. I.P., mice [1,2] | Dosing, mins. prior to irrad.[3] | Dose level, mg./kg, I.P. | Mice used, number | Percent survival[4] |
|---|---|---|---|---|---|
| 4-[2-n-octylamino)ethyldithio]butanesulfinic acid | 800 | 30 | 100 | 15 | 0 |
|  |  | 30 | 200 | 15 | 0 |
|  |  | 30 | 150 | 15 | 20 |
| 4-[2-aminoethyldithio]butanesulfinic acid | 500 | 30 | 100 | 15 | 20 |
|  |  | 30 | 200 | 15 | 20 |
|  |  | 30 | 300 | 15 | 67 |
|  |  | 15 | 12 | 15 | 0 |
|  |  | 15 | 23.5 | 15 | 47 |
|  |  | 15 | 24 | 15 | 0 |
|  |  | 15 | 47 | 15 | 100 |
| Sodium 4-[2-acetamidoethyldithio]butanesulfinate | 694 | 15 | 47 | 15 | 100 |
|  |  | 15 | 46.5 | 15 | 87 |
|  |  | 15 | 50 | 15 | 13 |
|  |  | 15 | 93 | 15 | 60 |
|  |  | 15 | 185 | 15 | 67 |
|  |  | 15 | 370 | 15 | 47 |
|  | [5] 50+ | 15 | [5] 50 | 15 | 30 |
|  |  | 30 | [5] 50 | 15 | 0 |
| Sodium 4-[2-acetamidoethyldithio]butanesulfonate | 1,200 | 30 | 400 | 15 | 0 |
|  |  | 30 | 800 | 15 | 40 |

[1] $ALD_{50}$=Approximate lethal dose, 50%.
[2] Toxicity determined by intra-peritoneal route on groups of 10 mice.
[3] Irradiation of mice done with standard dose of 950 roentgen of $\gamma$-rays from $Co^{60}$ source.
[4] Survival was based on a 30 day observation period.
[5] Testing done by oral route.

The meaning of the activity ratings are referred to in references: L. Field, H. K. Kim, and M. Bellas, *J. Med. Chem.*, 1166 (1967); L. Field, A. Ferretti, R. R. Crenshaw, and T. C. Owen, *J. Med. Chem.*, 39 (1964); and Klayman, Grenan, and Jacobus, *J. Med. Chem.*, Vol. 12, page 510, (1969).

We claim:

1. A compound of the formula:

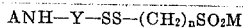

$$ANH-Y-SS-(CH_2)_nSO_2M$$

wherein A is hydrogen or acetyl, Y is a straight chain alkyl radical of two or three carbon atoms, n is an integer 3 through 5, and M is hydrogen, sodium or potassium.

2. 4-[2-Aminoethyldithio]butanesulfinic acid.

3. Sodium 4-[2-acetamidoethyldithio]butanesulfinate.

4. A process for the preparation of the compound of the formula:

$$H_2N-CH_2-CH_2-SS-(CH_2)_4-SO_2H$$

comprising:

a. forming a first solution by dissolving 1,4-butanedithiol in an aqueous alkali metal hydroxide solution;
b. adding p-toluenesulfonyl chloride to said first solution, whereby 1,2-dithiane is produced;
c. isolating said 1,2-dithiane;
d. forming a second solution by dissolving said 1,2-dithiane in acetic acid;
e. adding hydrogen peroxide to said second solution, whereby 1,2-dithiane 1,1-dioxide is produced;
f. isolating said 1,2-dithiane 1,1-dioxide;
g. forming a third solution by dissolving said 1,2-dithiane 1,1-dioxide in ethanol; and
h. adding to said third solution 2-mercaptoethylamine.

5. A process for the preparation of 2—$CH_2$compound of the formula:

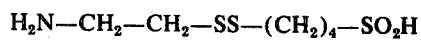

$$CH_3CONH-CH_2-SS-(CH_2)_4-SO_2Na$$

comprising:

a. forming a first solution by dissolving 1,4-butanedithiol in an aqueous alkali metal hydroxide solution;
b. adding p-toluenesulfonyl chloride to said first solution, whereby 1,2-dithiane is produced;
c. isolating said 1,2-dithiane;
d. forming a second solution by dissolving said 1,2-dithiane in acetic acid;
e. adding hydrogen peroxide to said second solution, whereby 1,2-dithiane 1,1-dioxide is produced;
f. isolating said 1,2-dithiane 1,1-dioxide;
g. forming a third solution by dissolving said 1,2-dithiane 1,1-dioxide in ethanol; and
h. adding to said third solution 2-acetamidoethanethiol and methanolic sodium methoxide.

* * * * *